United States Patent
Oh

(10) Patent No.: US 9,069,207 B2
(45) Date of Patent: Jun. 30, 2015

(54) DISPLAY DEVICE

(75) Inventor: Myong Rock Oh, Suwon-si (KR)

(73) Assignee: LG DISPLAY CO., LTD., Seoul (KR)

(*) Notice: Subject to any disclaimer, the term of this patent is extended or adjusted under 35 U.S.C. 154(b) by 712 days.

(21) Appl. No.: 12/530,572

(22) PCT Filed: Mar. 21, 2008

(86) PCT No.: PCT/KR2008/001604
§ 371 (c)(1),
(2), (4) Date: Sep. 9, 2009

(87) PCT Pub. No.: WO2008/117960
PCT Pub. Date: Oct. 2, 2008

(65) Prior Publication Data
US 2010/0045891 A1    Feb. 25, 2010

(30) Foreign Application Priority Data
Mar. 23, 2007 (KR) .................. 10-2007-0028544

(51) Int. Cl.
*G02F 1/1333* (2006.01)
*G02F 1/1335* (2006.01)
*F21V 8/00* (2006.01)

(52) U.S. Cl.
CPC .............. *G02F 1/133615* (2013.01); *G02F 2001/133317* (2013.01); *G02B 6/0088* (2013.01)
USPC ............................................ 349/58; 349/65

(58) Field of Classification Search
USPC ............. 349/58–65; 362/97.1–97.3, 600–634
See application file for complete search history.

(56) References Cited

U.S. PATENT DOCUMENTS

| | | | |
|---|---|---|---|
| 5,313,318 A | 5/1994 | Gruenberg et al. | |
| 6,870,582 B2* | 3/2005 | Hayashimoto et al. | 349/58 |
| 6,919,937 B2* | 7/2005 | Kim et al. | 349/58 |
| 2003/0043569 A1* | 3/2003 | Mori et al. | 362/31 |
| 2004/0028895 A1* | 2/2004 | Yamakami et al. | 428/354 |
| 2005/0073622 A1* | 4/2005 | Kitaka et al. | 349/58 |
| 2005/0094039 A1 | 5/2005 | Kim et al. | |
| 2006/0055839 A1 | 3/2006 | Hirao et al. | |
| 2006/0114694 A1 | 6/2006 | Cho et al. | |
| 2006/0125981 A1* | 6/2006 | Okuda | 349/110 |
| 2006/0139271 A1* | 6/2006 | Okuda | 345/88 |
| 2006/0171170 A1 | 8/2006 | Lee | |

(Continued)

FOREIGN PATENT DOCUMENTS

EP      1 491 940 A1    12/2004
JP      2003-43450 A    2/2003

(Continued)

OTHER PUBLICATIONS

English Language Machine Translation of KR 10-2006-0026248 A to Jae Hyun Kim, created Feb. 24, 2012.*

*Primary Examiner* — Bumsuk Won
*Assistant Examiner* — Charles Chang
(74) *Attorney, Agent, or Firm* — Birch, Stewart, Kolasch & Birch, LLP

(57) ABSTRACT

The invention provides a display device having a slim structure and a small size with enhanced strength. The display device according to an embodiment includes a display panel, a backlight assembly disposed below the display panel, a first support section surrounding lateral sides of the display panel, and a second support section extending from an inner side of the first support section such that the second support section is disposed at lateral sides of the backlight assembly.

8 Claims, 2 Drawing Sheets

(56) References Cited

U.S. PATENT DOCUMENTS

| | | |
|---|---|---|
| 2006/0187679 A1 | 8/2006 | Cha et al. |
| 2007/0008449 A1 | 1/2007 | Choi |
| 2007/0008457 A1 | 1/2007 | Takahashi et al. |
| 2007/0085941 A1* | 4/2007 | Chang et al. .................. 349/58 |
| 2007/0182880 A1* | 8/2007 | Yamada ......................... 349/61 |
| 2007/0222911 A1* | 9/2007 | Murase .......................... 349/58 |
| 2007/0252922 A1* | 11/2007 | Oohira ........................... 349/58 |
| 2009/0079894 A1* | 3/2009 | Okuda ............................ 349/58 |
| 2009/0268120 A1 | 10/2009 | Ogatsu |
| 2010/0265425 A1* | 10/2010 | Kawaguchi et al. ........... 349/58 |

FOREIGN PATENT DOCUMENTS

| | | |
|---|---|---|
| JP | 2003-330377 A | 11/2003 |
| JP | 2004-252278 A | 9/2004 |
| JP | 2006-235082 A | 9/2006 |
| JP | 2007-17783 A | 1/2007 |
| KR | 10-2003-0056686 A | 7/2003 |
| KR | 10-2005-0041549 A | 5/2005 |
| KR | 10-2006-0026248 A | 3/2006 |
| WO | WO 2006126376 A1 * | 11/2006 |
| WO | WO 2007/023846 A1 | 3/2007 |

\* cited by examiner

DISPLAY DEVICE

TECHNICAL FIELD

The embodiment relates to a display device.

BACKGROUND ART

As information processing technology has been developed, flat display devices such as LCDs, PDPs and AMOLEDs have been extensively used. In order to display an image, an electrical signal having a predetermined frequency can be applied to such flat display devices.

Portable flat display devices must have a slim structure and a small size. Further, such flat display devices must have enhanced strength.

DISCLOSURE OF INVENTION

Technical Problem

The embodiment provides a display device having a slim structure and a small size with enhanced strength.

Technical Solution

A display device according to an embodiment comprises: a display panel; a backlight assembly disposed below the display panel; a first support section surrounding lateral sides of the display panel; and a second support section extending from an inner side of the first support section such that the second support section is disposed at lateral sides of the backlight assembly.

A display device according to an embodiment comprises: a frame comprising a first support section and a second support section, which extends from an inner side of the first support section, and comprising metal; a display panel disposed inside the frame while being disposed on the second support section; and a backlight assembly disposed below the display panel while being disposed inside the second support section.

A display device according to an embodiment comprises: a display panel; a first support section surrounding lateral sides of the display panel; a second support section extending inward from the first support section while being disposed below the display panel; and a third support section extending outward from the first support section.

Advantageous Effects

A display device according to the embodiment can have a small size and a slim structure with improved strength by dint of first and second support sections.

In particular, the first and second support sections comprise metal, so that the display device according to the embodiment can have a smaller size and a slimmer structure with significantly improved strength.

BEST MODE FOR CARRYING OUT THE INVENTION

Figure 1:
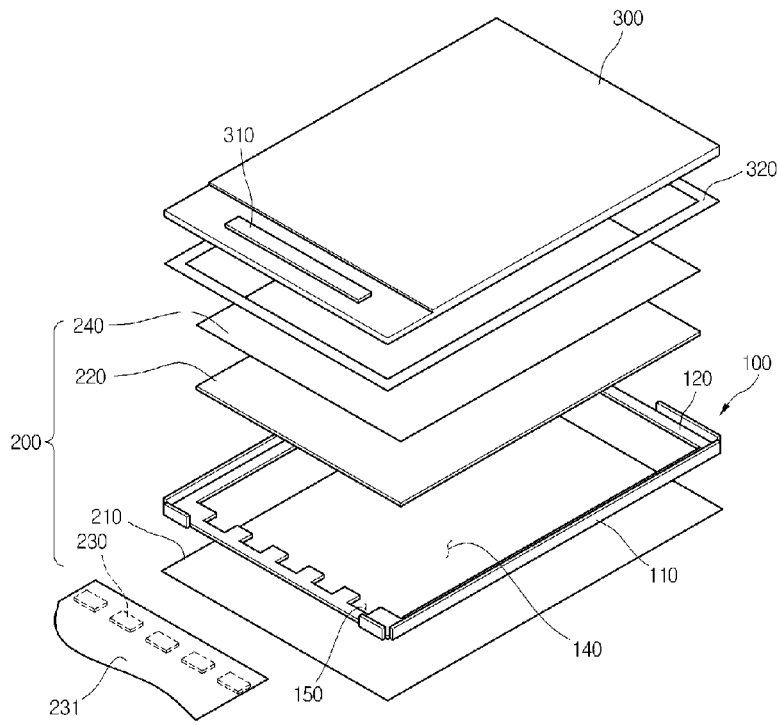
FIG. 1 illustrates an exploded perspective view of an LCD according to an embodiment.

In the description of an embodiment, it will be understood that, when a panel, a structure, a section, a seat, a plate or a frame is referred to as being "on" or "under" another panel, another structure, another section, another seat, another plate or another frame, it can be directly or indirectly on the other panel, structure, section, seat, plate or frame, or one or more intervening elements may also be present. Further, "on" or "under" of each element is determined based on the drawing.

Figure 2:
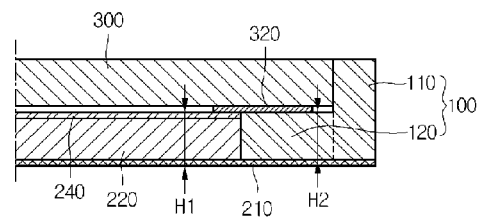
FIG. 2 illustrates a sectional view of an LCD according to the embodiment.

FIG. 1 illustrates an exploded perspective view of an LCD (liquid crystal display) according to an embodiment and FIG. 2 illustrates a sectional view of the LCD according to the embodiment.

Referring to FIGS. 1 and 2, the LCD comprises a frame 100, a backlight assembly 200 and a liquid crystal panel 300.

The frame 100 receives the backlight assembly 200 and the liquid crystal panel 300. The frame 100 comprises metal such as aluminum, copper, zinc and an alloy of these elements. The frame 100 comprises first and second support sections 110 and 120.

The first support section 110 surrounds lateral sides of the liquid crystal panel 300 to support the lateral sides of the liquid crystal panel 300. For example, the first support section 110 comprises a plurality of sidewalls spaced apart from each other.

The first support section 110 is disposed such that edges of the liquid crystal panel 300 can be exposed through edge portions of the first support section 110.

Further, when viewed in a plan view, the first support section 110 has a rectangular frame shape. For example, the first support section 110 has a height greater than the thickness of the liquid crystal panel 300.

The second support section 120 extends from the inner side of the first support section 110. In more detail, the second support section 120 extends from a lower part of the inner side of the first support section 110.

For example, the second support section 120 extends inward from the first support section 110.

Further, when viewed in a plan view, the second support section 120 has a closed loop shape. Thus, a receiving section 140, which can receive at least a part of the backlight assembly 200, is formed inside the second support section 120.

The backlight assembly 200 generates light to emit the light toward the liquid crystal panel 300. The back light assembly 200 is disposed in the receiving section 140 while being disposed inside the second support section 120. The backlight assembly 200 comprises a reflective sheet 210, a light guide plate 220, light emitting diodes 230 and an optical sheet 240.

The reflective sheet 210 is disposed below the frame 100. For example, the reflective sheet 210 can be attached to the bottom surface of the second support section 120 by using a double coated tape and the like. The reflective sheet 210 reflects the light in the upward direction, which is generated from the light emitting diodes 230.

The light guide plate 220 is disposed on the reflective sheet 210 while being located inside the receiving section 140. The light guide plate 220 guides the light, which is emitted from the light emitting diodes 230, toward the liquid crystal panel 300 through scattering, refraction and reflection and the like.

The light emitting diodes 230 are disposed at a lateral side of the light guide plate 220. The light emitting diodes 230 are disposed in receiving grooves 150 formed in the second support section 120. The light emitting diodes 230 are mounted on a FPCB (flexible printed circuit board) 231 to emit the light toward the light guide plate 220.

The optical sheet 240 is disposed on the light guide plate 220 while being located inside the receiving section 140. The optical sheet 240 improves the characteristics of light passing therethrough.

A plurality of optical sheets 240 can be provided to the display device. For example, the optical sheet 240 comprises at least one of a polarizing sheet, a diffusion sheet and a prism sheet.

The thickness H2 of the second support section 120 corresponds to a sum H1 of the thickness of the light guide plate 220 and the thickness of the optical sheet 240. In detail, the thickness H2 of the second support section 120 is substantially identical to the sum H1 of the thickness of the light guide plate 220 and the thickness of the optical sheet 240.

For example, the frame 100 is formed by cutting or bending a metal plate having a thickness substantially identical to the sum H1 of the thickness of the light guide plate 220 and the thickness of the optical sheet 240.

The liquid crystal panel 300 is disposed inside the frame 100. In more detail, the liquid crystal panel 300 is disposed inside the first support section 110. Further, the liquid crystal panel 300 is disposed on the second support section 120 while being supported by the second support section 120.

At this time, the lateral sides of the liquid crystal panel 300 can make contact with the first support section 110. Further, an elastic member can be interposed between the liquid crystal panel 300 and the first support section 110. The elastic member absorbs impact applied to the first support section 110 from an exterior.

The liquid crystal panel 300 adjusts the intensity of light, which passes therethrough, according to pixels that are image display units. The liquid crystal panel 300 comprises a TFT substrate, a color filter substrate and a liquid crystal interposed between the TFT substrate and the color filter substrate.

The liquid crystal panel 300 is attached to the second support section 120 and the optical sheet 240 through an adhesive member 320. In detail, the bottom surface of the adhesive member 320 adheres to the optical sheet 240 and the second support section 120, and the top surface of the adhesive member 320 adheres to the liquid crystal panel 300. The adhesive member 320 can comprise a double coated tape.

Further, the adhesive member 320 can comprise a light blocking tape. In detail, the adhesive member 320 can block light leaked between the first support section 110 and the liquid crystal panel 300.

Meanwhile, a driver IC 310 that drives the liquid crystal panel 300 is mounted on the liquid crystal panel 300.

Since the frame 100 comprises metal, the frame 100 is more solid than a plastic frame.

Further, since the liquid crystal panel 300 and the backlight assembly 200 can be supported even without using an additional member such as a mold frame, the LCD according to the embodiment can have a slim structure and a small size.

Since the sum H1 of the thickness of the light guide plate 220 and the thickness of the optical sheet 240 is substantially identical to the thickness H2 of the second support section 120, the gap between the reflective sheet 210 and the light guide plate 220 can be reduced.

Thus, the LCD according to the embodiment can have a slim structure.

Further, the top surface of the optical sheet 240 and the top surface of the second support section 120 are substantially located on the same plane. Thus, the adhesive member 320 can firmly adhere to the optical sheet 240 and the second support section 120.

Accordingly, the LCD according to the embodiment has enhanced strength.

Figure 3:
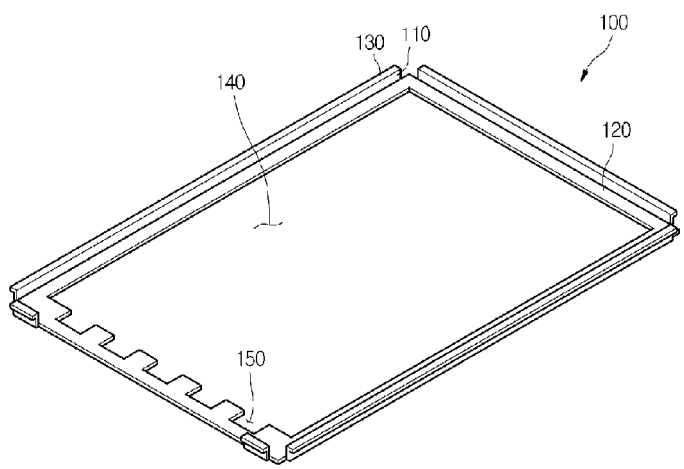
FIG. 3 illustrates an exploded perspective view of a frame according to another embodiment.
Figure 4:
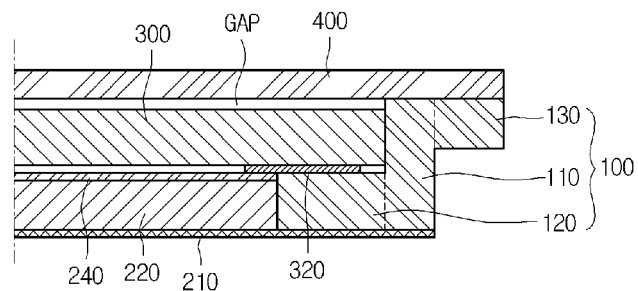
FIG. 4 illustrates a sectional view of an LCD according to another embodiment.

FIG. 3 is an exploded perspective view illustrating a frame according to another embodiment and FIG. 4 is a sectional view illustrating an LCD according to another embodiment. A description about the embodiment will be given with reference to the aforementioned embodiment, and a third support section and a touch panel will be additionally described.

Referring to FIGS. 3 and 4, the frame 100 comprises the third support section 130. The third support section 130 extends from the top of the outer side of the first support section 110. In detail, the third support section 130 is bent or smoothly bent from the first support section 110 and extends outward from the first support section 110.

The third support section 130 is disposed at a higher position than the second support section 120. Further, the third support section 130 extends outward from the top of the first support section 110.

The first to third support sections 110, 120 and 130 are integrally formed with each other and comprise metal. The third support section 130 has a top surface higher than that of the liquid crystal panel 300.

The touch panel 400 is disposed above the liquid crystal panel 300 to cover the liquid crystal panel 300. The touch panel 400 is disposed on the third support section 130 while being supported by the third support section 130. Further, the touch panel 400 is attached to the third support section 130 by using a double coated tape and the like.

The touch panel 400 converts a touch signal into an electrical signal. The electrical signal is applied to a system for driving the LCD. In detail, the signal is input to the LCD from the touch panel 400.

The gap is formed between the touch panel 400 and the liquid crystal panel 300. Thus, external impact is less applied to the liquid crystal panel 300, so that the LCD according to the embodiment can have improved strength.

Further, a protective window can be disposed on the third support section 130 instead of the touch panel 400. The protective window protects the liquid crystal panel 300 from external impact. The protective window can comprise plastic, glass, reinforced glass and the like.

Further, the gap is formed between the protective window and the liquid crystal panel 300, so that impact applied to the protective window is not directly applied to the liquid crystal panel 300.

Consequently, the LCD according to the embodiment has enhanced strength.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The embodiments can be used for displaying images.

The invention claimed is:
1. A display device comprising:
a display panel;
a backlight assembly disposed below the display panel;
a frame comprising a first support section and a second support section, wherein the first support section surrounds lateral sides of the display panel, and wherein the second support section extends from an inner side of the first support section such that the second support section is disposed at lateral sides of a light guide plate;

an optical sheet disposed below the display panel, wherein a lower surface of the frame is an opening, wherein the display panel is disposed on the second support section and comprises an adhesive member interposed between the display panel and the second support section, and wherein the adhesive member adheres to the display panel, the second support section and the backlight assembly;

a plurality of protrusions formed to extend the same length in the second support section;

a plurality of grooves respectively formed between each of the protrusions; and a plurality of light emitting diodes respectively disposed in each of the grooves, wherein a bottom surface of the adhesive member adheres to the optical sheet and the second support section and a top surface of the adhesive member adheres to the display panel, and wherein an edge of the first support section is an opening toward outside; a third support section extending outward from the first support section, wherein the first to third support sections are integrally formed with each other and comprise metal.

2. The display device as claimed in claim 1, wherein the second support section has a closed loop shape.

3. The display device as claimed in claim 1, wherein the backlight assembly comprises:

a light guide plate disposed below the optical sheet; and a reflective sheet disposed below the light guide plate, wherein the light emitting diodes disposed at a lateral side of the light guide plate.

4. The display device as claimed in claim 3, wherein a sum of a thickness of the optical sheet and a thickness of the light guide plate corresponds to a thickness of the second support section.

5. The display device as claimed in claim 3, wherein the reflective sheet is attached to a bottom surface of the second support section.

6. The display device as claimed in claim 1, further comprising an input device disposed on the third support section.

7. The display device as claimed in claim 1, further comprising a protective window disposed on the third support section.

8. A display device comprising:

a frame comprising a first support section and a second support section, which extends from an inner side of the first support section, and comprising metal;

a display panel disposed inside the frame while being disposed on the second support section;

a backlight assembly disposed below the display panel while being disposed inside the second support section;

an optical sheet disposed below the display panel;

a plurality of protrusions formed to extend the same length in the second support section;

a plurality of grooves respectively formed between each of the protrusions; and a plurality of light emitting diodes respectively disposed in each of the grooves, wherein the frame has a bent structure, wherein the first and second support sections are formed by the bent structure, wherein the display panel is disposed on the second support section and comprises an adhesive member interposed between the display panel and the second support section, wherein the adhesive member adheres to the display panel, the second support section and the backlight assembly, wherein a bottom surface of the adhesive member adheres to the optical sheet and the second support section and a top surface of the adhesive member adheres to the display panel, wherein an edge of the first support section is an opening toward outside, wherein a lower surface of the frame is an opening, wherein the frame comprises a third support section extending outward from the first support section, and wherein the third support section is disposed at a higher position than the second support section.

* * * * *